United States Patent
Liu

(10) Patent No.: US 11,201,681 B2
(45) Date of Patent: Dec. 14, 2021

(54) SIGNAL COMMUNICATION METHOD AND APPARATUS

(71) Applicant: HUAWEI TECHNOLOGIES CO., LTD., Guangdong (CN)

(72) Inventor: Jianqin Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/367,718

(22) Filed: Mar. 28, 2019

(65) Prior Publication Data

US 2019/0229821 A1 Jul. 25, 2019

Related U.S. Application Data

(63) Continuation of application No. PCT/CN2017/103107, filed on Sep. 25, 2017.

(30) Foreign Application Priority Data

Sep. 28, 2016 (CN) .......................... 201610858515.4

(51) Int. Cl.
*H04B 17/309* (2015.01)
*H04B 7/06* (2006.01)
(Continued)

(52) U.S. Cl.
CPC ......... *H04B 17/309* (2015.01); *H04B 7/0645* (2013.01); *H04B 7/0658* (2013.01);
(Continued)

(58) Field of Classification Search
CPC .... H04B 17/24; H04B 17/309; H04B 7/0645; H04B 7/0658; H04L 1/0026; H04L 1/0027; H04L 1/0029; H04W 52/0245
See application file for complete search history.

(56) References Cited

U.S. PATENT DOCUMENTS 8,064,406 B2 * 11/2011 Chun .................... H04L 1/0026
370/252
8,111,764 B2 * 2/2012 Chun .................... H04L 1/0029
370/252
(Continued)

FOREIGN PATENT DOCUMENTS

CN 101821969 A * 9/2010 ........... H04L 1/0029
CN 102055547 A 5/2011
(Continued)

OTHER PUBLICATIONS

R2-072584; Nokia, Nokia Siemens Networks; "Two-layer CQI Scheme for Improved PUCCH Efficiency"; 3GPP TSG-RAN WG2 Meeting #58bis; Orlando, U.S.A.; Jun. 25-29, 2007; Agenda item: 4.9; total 6 pages.
(Continued)

*Primary Examiner* — Eric Nowlin
(74) *Attorney, Agent, or Firm* — Fish & Richardson P.C.

(57) ABSTRACT

Embodiments of this application provide a signal communication method and apparatus. The method includes: sending, by a network device, a channel quality threshold to a terminal device, where the channel quality threshold is used by the terminal device to report first channel quality information, and the channel quality threshold is a threshold of second channel quality information; and receiving, by the network device, a first quantity of pieces of the first channel quality information sent by the terminal device based on the channel quality threshold.

18 Claims, 4 Drawing Sheets

(51) Int. Cl.
*H04L 1/00* (2006.01)
*H04B 17/24* (2015.01)
*H04W 52/02* (2009.01)

(52) U.S. Cl.
CPC ........... *H04B 17/24* (2015.01); *H04L 1/0026* (2013.01); *H04L 1/0027* (2013.01); *H04L 1/0029* (2013.01); *H04W 52/0245* (2013.01)

(56) References Cited

U.S. PATENT DOCUMENTS

| | | | | |
|---|---|---|---|---|
| 8,295,248 | B2* | 10/2012 | Kuchibhotla | H04W 72/1231 370/332 |
| 8,331,871 | B2* | 12/2012 | Roh | H04L 1/0029 370/329 |
| 9,007,988 | B2* | 4/2015 | Shen | H04L 1/0026 370/322 |
| 9,198,097 | B2* | 11/2015 | Chen | H04W 36/0085 |
| 9,397,816 | B2* | 7/2016 | Shen | H04L 1/0026 |
| 9,515,715 | B2* | 12/2016 | Zhang | H04L 1/0026 |
| 9,622,170 | B2* | 4/2017 | Zhu | H04W 52/0206 |
| 9,668,156 | B2* | 5/2017 | Jung | H04W 24/10 |
| 9,806,849 | B2* | 10/2017 | Kim | H04L 5/0057 |
| 10,333,672 | B2* | 6/2019 | Nagaraja | H04L 5/0048 |
| 10,574,311 | B2* | 2/2020 | Wang | H04L 1/0028 |
| 10,681,584 | B2* | 6/2020 | Kittichokechai | H04B 17/336 |
| 2005/0201296 | A1* | 9/2005 | Vannithamby | H04B 7/0632 370/241 |
| 2007/0098093 | A1* | 5/2007 | Kwon | H04L 1/0026 375/260 |
| 2008/0253336 | A1 | 10/2008 | Parkvall et al. | |
| 2009/0163199 | A1* | 6/2009 | Kazmi | H04W 24/04 455/425 |
| 2009/0201825 | A1* | 8/2009 | Shen | H04L 1/0029 370/252 |
| 2009/0316809 | A1* | 12/2009 | Chun | H04L 1/0029 375/260 |
| 2010/0035644 | A1 | 2/2010 | Wu et al. | |
| 2010/0110914 | A1* | 5/2010 | Chun | H04L 1/0026 370/252 |
| 2010/0233968 | A1* | 9/2010 | Roh | H04L 5/0044 455/67.13 |
| 2011/0021230 | A1* | 1/2011 | Moberg | H04L 1/0027 455/507 |
| 2013/0058239 | A1* | 3/2013 | Wang | H04L 25/0228 370/252 |
| 2014/0056220 | A1 | 2/2014 | Poitau et al. | |
| 2015/0280885 | A1* | 10/2015 | Shen | H04L 1/0027 370/329 |
| 2016/0094287 | A1 | 3/2016 | Kim et al. | |
| 2016/0149620 | A1 | 5/2016 | Ko et al. | |
| 2016/0149629 | A1* | 5/2016 | Zhang | H04L 1/0027 370/329 |
| 2016/0165466 | A1* | 6/2016 | Kim | H04L 5/0057 370/252 |
| 2016/0226604 | A1* | 8/2016 | Kazmi | H04L 1/0026 |
| 2016/0277165 | A1* | 9/2016 | Wei | H04L 27/0006 |
| 2016/0329940 | A1* | 11/2016 | Wang | H04B 7/0632 |
| 2018/0234153 | A1* | 8/2018 | Lincoln | H04B 7/0695 |
| 2018/0302130 | A1* | 10/2018 | Wang | H04L 1/0026 |
| 2019/0173563 | A1* | 6/2019 | Kakishima | H04B 7/0626 |
| 2019/0268056 | A1* | 8/2019 | Wang | H04B 7/0695 |

FOREIGN PATENT DOCUMENTS

| | | | | | |
|---|---|---|---|---|---|
| CN | 102064920 | A | | 5/2011 | |
| CN | 102271401 | A | | 12/2011 | |
| CN | 101821969 | B | * | 1/2013 | ........... H04L 25/022 |
| CN | 108347270 | A | * | 7/2018 | ........... H04B 7/0456 |
| EP | 2080299 | A1 | * | 7/2009 | ........... H04L 1/0029 |
| EP | 2080299 | B1 | * | 7/2014 | ........... H04L 1/0029 |
| KR | 20080040351 | A | * | 5/2008 | ........... H04L 1/0029 |
| KR | 101245475 | B1 | * | 3/2013 | ........... H04L 1/0029 |
| KR | 101341517 | B1 | * | 12/2013 | ........... H04L 25/022 |
| KR | 101370780 | B1 | * | 3/2014 | ........... H04L 1/0029 |
| WO | WO-2005091541 | A2 | * | 9/2005 | ........... H04B 7/0697 |
| WO | WO-2005091541 | A3 | * | 10/2005 | ........... H04L 1/0026 |
| WO | WO-2008054174 | A1 | * | 5/2008 | ........... H04L 1/0026 |
| WO | WO-2008115027 | A1 | * | 9/2008 | ........... H04L 1/0026 |
| WO | WO-2009028819 | A2 | * | 3/2009 | ........... H04L 5/0007 |
| WO | WO-2009028819 | A3 | * | 4/2009 | ........... H04L 1/0029 |
| WO | WO-2011050856 | A1 | * | 5/2011 | ........... H04L 5/0091 |
| WO | WO-2012054694 | A1 | * | 4/2012 | ............ H04B 7/065 |

OTHER PUBLICATIONS

PCT International Search Report in International Appln. No. PCT/CN2017/103107, dated Jan. 4, 2018, 4 pages (with English translation).

Extended European Search Report issued in European Application No. 17854793.1 dated Aug. 2, 2019, 9 pages.

Office Action issued in Indian Application No. 201947012014 dated Jan. 29, 2021, 5 pages.

* cited by examiner

SIGNAL COMMUNICATION METHOD AND APPARATUS

CROSS-REFERENCE TO RELATED APPLICATIONS

This application is a continuation of International Application No. PCT/CN2017/103107, filed on Sep. 25, 2017, which claims priority to Chinese Patent Application No. 201610858515.4, filed on Sep. 28, 2016, The disclosures of the aforementioned applications are hereby incorporated by reference in their entireties.

TECHNICAL FIELD

Embodiments of this application relate to the communications field, and more specifically, to a signal communication method and apparatus.

BACKGROUND

In a wireless communications system, to ensure communication reliability and improve communication efficiency, a network device usually estimates quality of a radio channel used to transmit a signal, and determines a scheduling scheme based on the quality of the radio channel. In a current wireless communications system, quality information of a radio channel is usually obtained by transmitting a reference signal. Different types of reference signals are usually used in the wireless communication system: One type of reference signal is used for channel quality measurement, for example, a cell-specific reference signal (CRS), so as to implement channel quality measurement, cell selection, and handovers; and another type of reference signal is used for channel state information measurement, so as to implement scheduling of a terminal device. For example, a terminal device can obtain corresponding channel state information (CSI) based on channel quality measurement of a channel state information-reference signal (CSI-RS).

In the prior art, to measure channel quality, a network device may send a plurality of reference signals to a terminal device and configure, for the terminal device, a quantity N of pieces of channel quality information that needs to be reported. The terminal device receives the plurality of reference signals sent by the network device; scans and measures, based on a configuration of the network device, all reference signals sent by the network device, to obtain N pieces of optimal channel quality information; and reports the N pieces of optimal channel quality information to the network device.

However, when all channel quality information corresponding to the plurality of reference signals sent by the network device is relatively poor, and the quantity N that is configured by the network device and that is of pieces of channel quality information that needs to be reported by the terminal device is relatively large, it is not necessary for the terminal device to report all of the N pieces of very poor channel quality information to the network device; otherwise, unnecessary signaling overheads are caused.

SUMMARY

In view of this, embodiments of this application provide a signal communication method and apparatus, so as to prevent a terminal device from reporting unnecessary channel quality information, and reduce signaling overheads and energy consumption of the terminal device.

According to a first aspect, a signal communication method is provided, where the method includes: sending, by a network device, a channel quality threshold to a terminal device, where the channel quality threshold is used by the terminal device to report first channel quality information, and the channel quality threshold is a threshold of second channel quality information; and receiving, by the network device, a first quantity of pieces of the first channel quality information sent by the terminal device based on the channel quality threshold.

It should be understood that the first channel quality information is a reporting quantity, and the second channel quality information is a trigger quantity. For a specific reference signal, once second channel quality information corresponding to the reference signal exceeds the channel quality threshold, the terminal device may determine to report first channel quality information corresponding to the reference signal. The first channel quality information may be the same as or different from the second channel quality information, and this is not limited in this embodiment of this application.

According to the signal communication method in this embodiment of this application, the network device sends the channel quality threshold to the terminal device, and triggers the terminal device to report channel quality information corresponding to a reference signal that meets a condition. This can prevent the terminal device from reporting unnecessary channel quality information, and reduce signaling overheads and energy consumption of the terminal device, thereby improving user experience.

Optionally, a plurality of reporting manners may be used by the terminal device to send the first quantity of pieces of the first channel quality information to the network device. When determining second channel quality information corresponding to a first quantity of reference signals that meet the channel quality threshold, the terminal device may send all first channel quality information corresponding to the first quantity of reference signals together to the network device, that is, use a batch reporting manner; or may separately send the first channel quality information to the network device in sequence, that is, use a separate reporting manner. This is not limited in this embodiment of this application.

In the separate reporting manner, if determining that a quantity of pieces of the first channel quality information reported by the terminal device has met a requirement, the network device may instruct the terminal device to stop sending a reference signal and stop channel quality detection for the reference signal, and the network device may also stop sending a reference signal. This reduces signaling sending overheads and processing complexity on both sides of the network device and the terminal device.

The network device needs to reserve a time-frequency resource for the terminal device before the terminal device reports the channel quality information to the network device. Therefore, compared with the random separate reporting manner, the batch reporting manner can greatly reduce a quantity of to-be-reserved resources, thereby greatly increasing resource utilization.

Optionally, the terminal device may determine the reporting manner based on the channel quality threshold sent by the network device. If the channel quality threshold is relatively small, the terminal device may use the batch reporting manner; or if the channel quality threshold is relatively large, the terminal device may use the separate reporting manner. This is not limited in this embodiment of this application.

In a first possible implementation of the first aspect, before the receiving, by the network device, a first quantity of pieces of the first channel quality information sent by the terminal device based on the channel quality threshold, the method further includes: sending, by the network device, a second quantity to the terminal device, where the second quantity is used to indicate a quantity of pieces of the first channel quality information configured for the terminal device by the network device; and the receiving, by the network device, a first quantity of pieces of the first channel quality information sent by the terminal device based on the channel quality threshold includes: receiving, by the network device, the first quantity of pieces of the first channel quality information sent by the terminal device based on the channel quality threshold and the second quantity, where the first quantity is less than or equal to the second quantity.

It should be understood that the second quantity is a quantity of pieces of first channel quality information that the network device requests the terminal device to report. The terminal device may receive the second quantity sent by the network device, and then determine and send the first quantity of pieces of first channel quality information based on the channel quality threshold and/or the second quantity. Therefore, the first quantity may be less than or equal to the second quantity.

Optionally, a value of the second quantity may be any one of 1, 2, or 4.

Therefore, according to the signal communication method in this embodiment of this application, the terminal device can be prevented from reporting unnecessary channel quality information, thereby reducing signaling overheads of the terminal device.

With reference to the foregoing possible implementation of the first aspect, in a second possible implementation of the first aspect, the sending, by the network device, a second quantity to the terminal device includes: sending, by the network device, first signaling to the terminal device, where the first signaling carries the second quantity, and the first signaling is higher layer signaling or physical layer signaling.

With reference to any one of the first aspect or the foregoing possible implementations of the first aspect, in a third possible implementation of the first aspect, the sending, by a network device, a channel quality threshold to a terminal device includes: sending, by the network device, second signaling to the terminal device, where the second signaling carries the channel quality threshold, and the second signaling is higher layer signaling and/or physical layer signaling.

It should be understood that the higher layer signaling may be radio resource control (RRC) signaling, and the physical layer signaling may be downlink control information (DCI) signaling. The higher layer signaling and the physical layer signaling may alternatively be other signaling. This is not limited in this embodiment of this application. In addition, any combination of the other signaling may be further used by the network device to send the second quantity and the channel quality threshold. This is not limited in this embodiment of this application.

With reference to any one of the first aspect or the foregoing possible implementations of the first aspect, in a fourth possible implementation of the first aspect, the receiving, by the network device, a first quantity of pieces of the first channel quality information sent by the terminal device based on the channel quality threshold includes: receiving, by the network device, the first quantity and the first quantity of pieces of the first channel quality information that are sent by the terminal device based on the channel quality threshold.

In this embodiment, the terminal device may perform reporting based on an actual situation. The network device may determine, based on the first quantity sent by the terminal device, a quantity of pieces of first channel quality information reported by the terminal device, and decode the quantity of pieces of first channel quality information, so as to reduce reporting overheads of the terminal device.

With reference to any one of the first aspect or the foregoing possible implementations of the first aspect, in a fifth possible implementation of the first aspect, before the receiving, by the network device, a first quantity of pieces of the first channel quality information sent by the terminal device based on the channel quality threshold, the method further includes: sending, by the network device, a first notification message to the terminal device, where the first notification message is used to notify sending of a reference signal from the network device to the terminal device.

Specifically, before sending the reference signal to the terminal device, the network device may first send the first notification message to the terminal device, to notify the terminal device that the network device is to send reference signals to the terminal device at the following P (P is an integer greater than or equal to 1) consecutive reference-signal transmit time points. In this case, the terminal device can get ready to receive, in a timely manner, the reference signals sent by the network device, and measure channel quality corresponding to the reference signals.

With reference to any one of the first aspect or the foregoing possible implementations of the first aspect, in a sixth possible implementation of the first aspect, the method further includes: sending, by the network device, a second notification message to the terminal device, where the second notification message is used to notify termination of sending of a reference signal from the network device to the terminal device.

Specifically, the network device may send the second notification message to the terminal device, to notify the terminal device that the network device stops sending a reference signal. It should be understood that when the terminal device reports first channel quality information corresponding to each reference signal that meets the channel quality threshold, if the network device already determines a first quantity of pieces of first channel quality information that meets the channel quality threshold, the network device may send the second notification message to the terminal device, and after receiving the second notification message, the terminal device no longer receives a reference signal, nor measures channel quality of the reference signal, nor reports first channel quality information to the network device. This reduces reporting overheads of the terminal device and processing complexity of the terminal device to some extent.

With reference to any one of the first aspect or the foregoing possible implementations of the first aspect, in a seventh possible implementation of the first aspect, the first channel quality information is at least one of the following information: a reference signal index, a reference signal received power (RSRP) corresponding to the reference signal index, a reference signal received quality (RSRQ) corresponding to the reference signal index, or a channel quality indicator (CQI) corresponding to the reference signal index, where the reference signal index is used to indicate a reference signal corresponding to the first channel quality information.

It should be understood that the first channel quality information may be CSI information in LTE, for example, at least one of a channel state information reference signal indicator (CSI-RS indicator, CRI), a rank indicator (RI), a precoding matrix indicator (PMI), a channel quality indicator (CQI), and the like. Alternatively, the first channel quality information may be channel quality information obtained through radio resource management (RRM) measurement, for example, at least one of an RSRP, an RSRQ, and the like. In addition, the first channel quality information may alternatively be any one or more pieces of other channel quality information different from the foregoing information, or may further include both the foregoing information and any one or more pieces of other channel quality information. This is not limited in this embodiment of this application.

With reference to any one of the first aspect or the foregoing possible implementations of the first aspect, in an eighth possible implementation of the first aspect, the second channel quality information is a reference signal received power RSRP, a reference signal received quality RSRQ, or a channel quality indicator CQI.

It should be understood that the second channel quality information may be any one of the CRI, RI, PMI, CQI, RSRP, or RSRQ, or may be any type of other channel quality information. This is not limited in this embodiment of this application.

According to a second aspect, another signal communication method is provided, where the method includes: receiving, by a terminal device, a channel quality threshold sent by a network device, where the channel quality threshold is used by the terminal device to report first channel quality information, and the channel quality threshold is a threshold of second channel quality information; determining, by the terminal device, a first quantity of pieces of the first channel quality information based on the channel quality threshold; and sending, by the terminal device, the first quantity of pieces of the first channel quality information to the network device.

According to the signal communication method in this embodiment of this application, the terminal device receives the channel quality threshold sent by the network device, and the terminal device is triggered to report channel quality information corresponding to a reference signal that meets a condition. This can prevent the terminal device from reporting unnecessary channel quality information, and reduce signaling overheads and energy consumption of the terminal device, thereby improving user experience.

In a first possible implementation of the second aspect, before the sending, by the terminal device, the first quantity of pieces of the first channel quality information to the network device based on the channel quality threshold, the method further includes: receiving, by the terminal device, a second quantity sent by the network device, where the second quantity is used to indicate a quantity of pieces of the first channel quality information configured for the terminal device by the network device; and the sending, by the terminal device, the first quantity of pieces of the first channel quality information to the network device based on the channel quality threshold includes: sending, by the terminal device, the first quantity of pieces of the first channel quality information to the network device based on the channel quality threshold and the second quantity, where the first quantity is less than or equal to the second quantity.

With reference to the foregoing possible implementation of the second aspect, in a second possible implementation of the second aspect, before the sending, by the terminal device, the first quantity of pieces of the first channel quality information to the network device based on the channel quality threshold, the method further includes: determining, by the terminal device, the first quantity based on the channel quality threshold and the second quantity; and the sending, by the terminal device, the first quantity of pieces of the first channel quality information to the network device based on the channel quality threshold includes: sending, by the terminal device, the first quantity and the first quantity of pieces of the first channel quality information to the network device.

With reference to the foregoing possible implementation of the second aspect, in a third possible implementation of the second aspect, the sending, by the terminal device, the first quantity and the first quantity of pieces of the first channel quality information to the network device includes: separately encoding, by the terminal device, the first quantity and the first quantity of pieces of the first channel quality information; and sending, by the terminal device, the encoded first quantity and the first quantity of pieces of the encoded first channel quality information to the network device.

With reference to any one of the second aspect or the foregoing possible implementations of the second aspect, in a fourth possible implementation of the second aspect, before the sending, by the terminal device, the first quantity of pieces of the first channel quality information to the network device based on the channel quality threshold, the method further includes: receiving, by the terminal device, a first notification message sent by the network device, where the first notification message is used to notify sending of a reference signal from the network device to the terminal device.

With reference to any one of the second aspect or the foregoing possible implementations of the second aspect, in a fifth possible implementation of the second aspect, the method further includes: receiving, by the terminal device, a second notification message sent by the network device, where the second notification message is used to notify termination of sending of a reference signal from the network device to the terminal device.

With reference to any one of the second aspect or the foregoing possible implementations of the second aspect, in a sixth possible implementation of the second aspect, the first channel quality information is at least one of the following information: a reference signal index, a reference signal received power RSRP corresponding to the reference signal index, a reference signal received quality RSRQ corresponding to the reference signal index, or a channel quality indicator CQI corresponding to the reference signal index, where the reference signal index is used to indicate a reference signal corresponding to the first channel quality information.

With reference to any one of the second aspect or the foregoing possible implementations of the second aspect, in a seventh possible implementation of the second aspect, the second channel quality information is a reference signal received power RSRP, a reference signal received quality RSRQ, or a channel quality indicator CQI.

With reference to any one of the second aspect or the foregoing possible implementations of the second aspect, in an eighth possible implementation of the second aspect, the sending, by the terminal device, the first quantity of pieces of the first channel quality information to the network device based on the channel quality threshold includes: sending, by the terminal device, the first quantity of pieces of the first channel quality information to the network device by using a physical uplink control channel PUCCH and/or a physical uplink shared channel PUSCH.

According to a third aspect, a signal communication apparatus is provided, and is configured to perform the method in any one of the first aspect or the possible implementations of the first aspect.

Specifically, the apparatus includes a unit configured to perform the method in any one of the first aspect or the possible implementations of the first aspect.

According to a fourth aspect, a signal communication apparatus is provided, and is configured to perform the method in any one of the second aspect or the possible implementations of the second aspect.

Specifically, the apparatus includes a unit configured to perform the method in any one of the second aspect or the possible implementations of the second aspect.

According to a fifth aspect, a signal communication apparatus is provided. The apparatus includes a receiver, a transmitter, a memory, a processor, and a bus system. The receiver, the transmitter, the memory, and the processor are connected by using the bus system; the memory is configured to store an instruction; the processor is configured to execute the instruction stored in the memory, to control the receiver to receive a signal and control the transmitter to send a signal; and when the processor executes the instruction stored in the memory, the execution enables the processor to perform the method in any one of the first aspect or the possible implementations of the first aspect.

According to a sixth aspect, a signal communication apparatus is provided. The apparatus includes a receiver, a transmitter, a memory, a processor, and a bus system. The receiver, the transmitter, the memory, and the processor are connected by using the bus system; the memory is configured to store an instruction; the processor is configured to execute the instruction stored in the memory, to control the receiver to receive a signal and control the transmitter to send a signal; and when the processor executes the instruction stored in the memory, the execution enables the processor to perform the method in any one of the second aspect or the possible implementations of the second aspect.

According to a seventh aspect, a signal communication system is provided. The system includes the apparatus in any one of the third aspect or possible implementations of the third aspect and the apparatus in any one of the fourth aspect or possible implementations of the fourth aspect; or the system includes the apparatus in any one of the fifth aspect or possible implementations of the fifth aspect and the apparatus in any one of the sixth aspect or possible implementations of the sixth aspect.

According to an eighth aspect, a computer readable medium is provided, and is configured to store a computer program. The computer program includes an instruction used to perform the method in any one of the first aspect or the possible implementations of the first aspect.

According to a ninth aspect, a computer readable medium is provided, and is configured to store a computer program. The computer program includes an instruction used to perform the method in any one of the second aspect or the possible implementations of the second aspect.

DESCRIPTION OF EMBODIMENTS

The following describes the technical solutions in the embodiments of this application with reference to the accompanying drawings in the embodiments of this application.

It should be understood that the technical solutions of the embodiments of this application may be applied to various communications systems, such as a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), a Worldwide Interoperability for Microwave Access (WiMAX) communications system, and a future 5G communications system.

Figure 1:
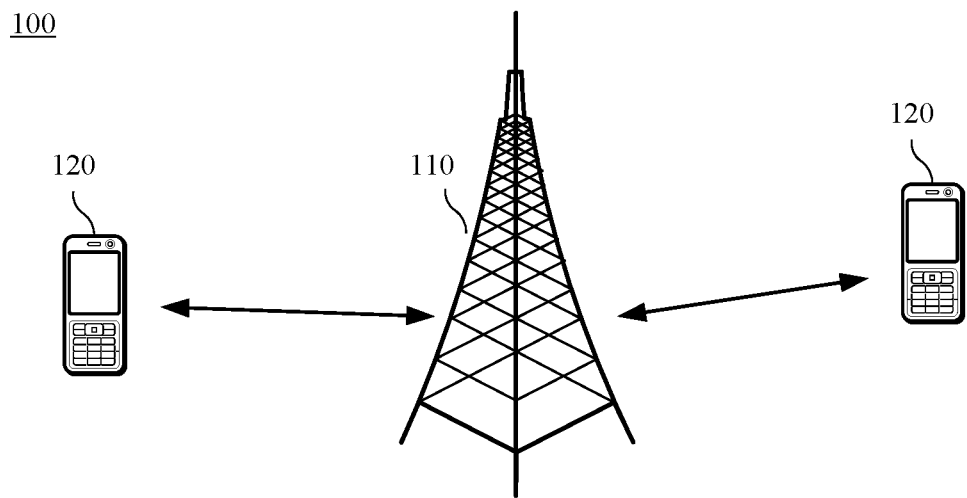
FIG. 1 is a schematic diagram of a communications system to which an embodiment of this application is applied.

FIG. 1 shows a wireless communications system 100 used in an embodiment of this application. The wireless communication system 100 may include at least one network device 110. The network device 110 may be a device that communicates with a terminal device, for example, a base station or a base station controller. Each network device 110 can provide communication coverage for a particular geographic area, and can communicate with a terminal device (for example, UE) located within the coverage area (cell). The network device 110 may be a base transceiver station (BTS) in a GSM system or a Code Division Multiple Access (CDMA) system, a NodeB (NB) in a WCDMA system, an evolved NodeB (eNB or eNodeB) in an LTE system, or an access controller in a cloud radio access network (CRAN). Alternatively, the network device may be a relay node, an access point, an in-vehicle device, a wearable device, a network-side device in a future 5G network, a network device in a future evolved public land mobile network (PLMN) network, or the like.

The wireless communications system 100 further includes a plurality of terminal devices 120 located within the coverage area of the network device 110. The terminal devices 120 may be mobile or stationary. The terminal device 120 may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved public land mobile network.

FIG. 1 shows an example of one network device and two terminal devices. Optionally, the wireless communication system 100 may include a plurality of network devices, and another quantity of terminal devices may be included within a coverage area of each network device. This is not limited in this embodiment of this application.

Optionally, the wireless communications system 100 may further include another network entity such as a network controller or a mobility management entity. This is not limited in this embodiment of this application.

In the prior art, to measure channel quality, a network device may send a plurality of reference signals to a terminal device and configure, for the terminal device, a quantity N of pieces of channel quality information that needs to be reported. The terminal device receives the plurality of reference signals sent by the network device; scans and measures, based on a configuration of the network device, all reference signals sent by the network device, to obtain N pieces of optimal channel quality information; and reports the N pieces of optimal channel quality information to the network device.

With development of communications technologies, a signal communication mechanism based on a beamforming technology may be used to receive and send a reference signal, so as to compensate a signal loss in a broadcasting process by using a relatively high antenna gain. This ensures a remarkable improvement of parameters such as uplink coverage performance, an average cell throughput, and an edge-user rate. The beamforming technology is any one of analog beamforming, digital beamforming, or hybrid beamforming. A signal in the beamforming may be a cell-specific type 1 reference signal, a user-specific type 2 reference signal, or another reference signal.

Specifically, a beam management mechanism for beamforming-based signal communication includes three primary processes:

(1) Selection of one or more optimal transmit-receive beam pairs: The terminal device selects an optimal transmit beam and/or an optimal receive beam based on different beams scanned on a network device side.

(2) Transmit-beam updating: The terminal device updates a transmit beam based on different transmit beams scanned on a network device side.

(3) Receive-beam updating: The terminal device updates a receive beam based on a same transmit beam scanned repeatedly on a network device side.

The terminal device can track and update a sending or receiving beam by using the foregoing beam management mechanism.

In the beamforming-based signal communication mechanism, optionally, reference signals are in a one-to-one correspondence with beams, and channel quality information corresponding to the reference signals is also in a one-to-one correspondence with beams. To measure channel quality of a plurality of reference signals to track and update beams, the network device may directly configure, for the terminal device, a quantity N of to-be-selected optimal beams corresponding to the reference signals, and the terminal device reports corresponding channel quality information based on the beam quantity N. In this case, the quantity N of to-be-selected optimal beams is a quantity N of pieces of channel quality information corresponding to the beams. Optionally, the quantity N is also a quantity of reference signals corresponding to the to-be-selected optimal beams.

However, when all channel quality information corresponding to the plurality of reference signals sent by the network device is relatively poor, and the quantity N that is configured by the network device and that is of pieces of channel quality information that needs to be reported by the terminal device is relatively large, it is not necessary for the terminal device to report all of the N pieces of channel quality information to the network device; otherwise, unnecessary signaling overheads are caused.

Figure 2:
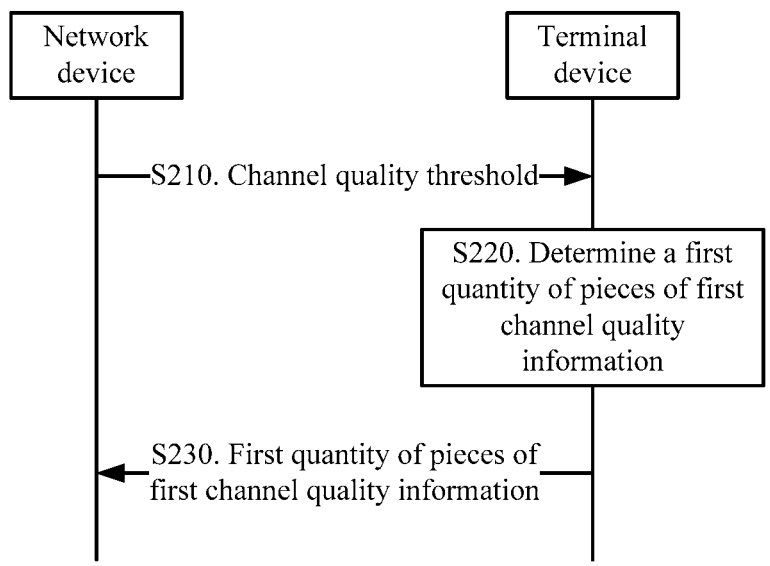
FIG. 2 is a schematic flowchart of a signal communication method according to an embodiment of this application.

FIG. 2 is a schematic flowchart of a signal communication method 200 according to an embodiment of this application. The method 200 may be applied to the system architecture shown in FIG. 1. However, no limitation is imposed thereon in this embodiment of this application.

S210. A network device sends a channel quality threshold to a terminal device, where the channel quality threshold is used by the terminal device to report first channel quality information, and the channel quality threshold is a threshold of second channel quality information.

S220. The terminal device receives the channel quality threshold sent by the network device, and determines a first quantity of pieces of the first channel quality information based on the channel quality threshold.

S230. The terminal device sends the first quantity of pieces of the first channel quality information to the network device.

Specifically, the network device may send the channel quality threshold to the terminal device. The channel quality threshold is used to trigger the terminal device to report the first channel quality information, and the channel quality threshold is the threshold of the second channel quality information. That is, the first channel quality information is a reporting quantity, and the second channel quality information is a trigger quantity. For a specific reference signal, once second channel quality information corresponding to the reference signal exceeds the channel quality threshold, the terminal device may determine to report first channel quality information corresponding to the reference signal. It should be understood that the first channel quality information may be the same as or different from the second channel quality information, and this is not limited in this embodiment of this application.

The terminal device receives the channel quality threshold sent by the network device, compares the channel quality threshold with second channel quality information corresponding to each of a plurality of received reference signals, and if second channel quality information corresponding to a reference signal is greater than the channel quality threshold, determines to report first channel quality information corresponding to the reference signal. The terminal device may determine a first quantity of pieces of the first channel quality information, and then send the first quantity of pieces of the first channel quality information to the network device, where the first quantity is an integer greater than or equal to 1.

Therefore, according to the signal communication method in this embodiment of this application, the network device sends the channel quality threshold to the terminal device, and triggers the terminal device to report channel quality information corresponding to a reference signal that meets a threshold condition. This can prevent the terminal device from reporting unnecessary channel quality information, and reduce signaling overheads and energy consumption resulting from reporting of the terminal device, thereby improving user experience.

It should be understood that a plurality of reporting manners may be used by the terminal device to send the first quantity of pieces of the first channel quality information to the network device. When determining second channel quality information corresponding to a first quantity of reference signals that meet the channel quality threshold, the terminal device may send all first channel quality information corresponding to the first quantity of reference signals together to the network device, that is, use a batch reporting manner; or may separately send the first channel quality information to the network device in sequence, that is, use a separate reporting manner. This is not limited in this embodiment of this application.

Specifically, in the separate reporting manner, for example, if the network device sends the reference signals to the terminal device in a time division manner, when receiving a first reference signal, the terminal device may detect channel quality corresponding to the first reference signal, so as to determine the first channel quality information and the second channel quality information. If the second channel quality information exceeds the channel quality threshold, the terminal device may immediately report the first channel quality information corresponding to the first reference signal to the network device, with no need to wait until channel quality measurement on all subsequent reference signals is completed. After detecting other reference signals that meet the condition, the terminal device sends first channel quality information corresponding to the subsequent other reference signals to the network device in sequence. When receiving the first quantity of pieces of the first channel quality information sent by the terminal device, the network device can determine, based on the first channel quality information, channel quality information corresponding to the first quantity of reference signals, so as to perform subsequent data communication. If determining that a quantity of pieces of the first channel quality information reported by the terminal device has met a requirement, the network device may instruct the terminal device to stop sending a reference signal and stop channel quality detection for the reference signal, and the network device may also stop sending a reference signal. This reduces signaling sending overheads and processing complexity on both sides of the network device and the terminal device.

However, in the batch reporting manner, the terminal device may determine first channel quality information corresponding to a plurality of reference signals that meet a condition, and then send all the first channel quality information together to the network device. The network device needs to reserve a time-frequency resource for the terminal device before the terminal device reports the channel quality information to the network device. Therefore, a time-frequency resource that needs to be reserved for the terminal device can be reduced in the batch reporting manner, thereby greatly increasing resource utilization.

Optionally, the terminal device may determine the reporting manner based on the channel quality threshold sent by the network device. If the channel quality threshold is relatively small, the terminal device may use the batch reporting manner; or if the channel quality threshold is relatively large, the terminal device may use the separate reporting manner. For example, if the second channel quality information is a reference signal received power RSRP, when a corresponding channel quality threshold is −100 dB, the terminal device may determine to perform batch reporting, or when a corresponding channel quality threshold is −70 dB, the terminal device may determine to perform separate reporting. This is not limited in this embodiment of this application.

It should be understood that there is a correspondence between the channel quality threshold and a reporting manner. A specific channel quality threshold may be corresponding to a reporting manner, or a channel quality threshold range may be corresponding to a reporting manner. This is not limited in this embodiment of this application. In addition, the correspondence may be negotiated in advance by the terminal device with the network device, or may be notified by the network device to the terminal device; and the correspondence may be sent before the network device sends the channel quality threshold to the terminal device, or may be sent together with the channel quality threshold. This is not limited in this embodiment of this application.

In an optional embodiment, before the sending, by the terminal device, the first quantity of pieces of the first channel quality information to the network device based on the channel quality threshold in S230, the method further includes:

receiving, by the terminal device, a second quantity sent by the network device, where the second quantity is used to indicate a quantity of pieces of the first channel quality information configured for the terminal device by the network device; and correspondingly, sending, by the network device, the second quantity to the terminal device.

The sending, by the terminal device, the first quantity of pieces of the first channel quality information to the network device based on the channel quality threshold in S230 includes:

sending, by the terminal device, the first quantity of pieces of the first channel quality information to the network device based on the channel quality threshold and the second quantity, where the first quantity is less than or equal to the second quantity.

Correspondingly, the network device receives the first quantity of pieces of the first channel quality information sent by the terminal device based on the channel quality threshold and the second quantity.

Optionally, a value of the second quantity may be any one of 1, 2, or 4.

Specifically, when configuring the channel quality threshold for the terminal device, the network device may further configure, for the terminal device, a quantity of pieces of the first channel quality information that needs to be reported, that is, the second quantity. It should be understood that the second quantity is a quantity of pieces of first channel quality information that the network device requests the terminal device to report. The terminal device may receive the second quantity sent by the network device, and then send the first quantity of pieces of first channel quality information based on the channel quality threshold and the second quantity. Therefore, the first quantity may be less than or equal to the second quantity.

For example, if the network device requests the terminal device to report first channel quality information corresponding to five optimal reference signals, and after scanning and detecting all reference signals, the terminal device finds only three reference signals whose second channel quality information exceeds the channel quality threshold, the terminal device may send first channel quality information corresponding to the three reference signals to the network device. Assuming that each piece of the first channel quality information includes a reference signal index and a reference signal received power RSRP. Nine bits are required for reporting each reference signal index, and seven bits are required for reporting each RSRP. When the network device configures, for the terminal device, first channel quality information corresponding to five reference signals, and the terminal device actually reports first channel quality information corresponding to three reference signals, (9+7)×2=32 bits can be saved for the terminal device.

Therefore, according to the signal communication method in this embodiment of this application, the terminal device can be prevented from reporting unnecessary channel quality information, thereby reducing signaling overheads of the terminal device.

In addition, it should be understood that if the terminal device uses a sequential reporting manner, when the terminal device scans the plurality of reference signals sent by the network device, and at an initial stage, the terminal device has found, through channel quality measurement of the plurality of reference signals, based on a channel quality threshold and the second quantity (for example, N) configured by the network device, N reference signals that meet the channel quality threshold, and has reported first channel quality information corresponding to the N reference signals, the terminal device may stop scanning subsequent reference signals and stop measuring corresponding channel quality. In addition, when finding that a quantity of pieces of channel quality information that has been reported by the terminal device is equal to N, the network device may stop sending subsequent reference signals.

In addition, when the network device does not configure, for the terminal device, the second quantity required for reporting by the terminal device, the network device may determine, based on the quantity of pieces of channel quality information reported by the terminal device, whether to continue to send the subsequent reference signals.

It can be learned that, in this embodiment of this application, not only reporting resource overheads of the terminal device can be reduced, but also communication resource overheads of the network device can be reduced; in addition, processing complexity of the terminal device is reduced.

In an optional embodiment, the sending, by the network device, the second quantity to the terminal device includes:

sending, by the network device, first signaling to the terminal device, where the first signaling carries the second quantity, and the first signaling is higher layer signaling or physical layer signaling.

In an optional embodiment, the sending, by a network device, a channel quality threshold to a terminal device includes:

sending, by the network device, second signaling to the terminal device, where the second signaling carries the channel quality threshold, and the second signaling is higher layer signaling and/or physical layer signaling.

Specifically, there may be the following four cases in which the network device configures, for the terminal device, the second quantity and the channel quality threshold:

(1) The network device may send the second quantity to the terminal device by using higher layer signaling, and send the channel quality threshold to the terminal device by using higher layer signaling.

(2) The network device may send the second quantity to the terminal device by using physical layer signaling, and send the channel quality threshold to the terminal device by using physical layer signaling.

(3) The network device may send the second quantity to the terminal device by using higher layer signaling, and send the channel quality threshold to the terminal device by using physical layer signaling.

(4) The network device may send the second quantity to the terminal device by using physical layer signaling, and send the channel quality threshold to the terminal device by using higher layer signaling.

Optionally, the network device may send the channel quality threshold to the terminal device in a manner of combining higher layer signaling and physical layer signaling. That is, the second signaling may include the higher layer signaling and the physical layer signaling. Specifically, the network device may send, to the terminal device by using the higher layer signaling, a plurality of candidate channel quality thresholds and threshold identifiers corresponding to all of the plurality of candidate channel quality thresholds, and send a first threshold identifier to the terminal device by using physical layer signaling. The first threshold identifier is a channel quality threshold, configured for the terminal device by the network device, of the plurality of candidate channel quality thresholds. After receiving the second signaling, the terminal device may determine, based on the first threshold identifier, the channel quality threshold configured for the terminal device by the network device.

For example, the network device may send, to the terminal device by using higher layer signaling, a plurality of candidate channel quality thresholds {−70, −80, −90, −100} and threshold identifiers {1, 2, 3, 4} corresponding to all of the candidate channel quality thresholds, and the network device may send a first threshold identifier 2 to the terminal device by using physical layer signaling. After receiving the higher layer signaling and the physical layer signaling, the terminal device may determine, based on the first threshold identifier 2, that the channel quality threshold configured for the terminal device by the network device is −80.

In this case, the network device does not need to add excessive information to the physical layer signaling. This can reduce signaling overheads of the physical layer signaling.

It should be understood that the higher layer signaling may be radio resource control (RRC) signaling, and the physical layer signaling may be downlink control information (DCI) signaling. The higher layer signaling and the physical layer signaling may alternatively be other signaling. This is not limited in this embodiment of this application. In addition, any combination of the other signaling may be further used by the network device to send the second quantity and the channel quality threshold. This is not limited in this embodiment of this application.

In an optional embodiment, the receiving, by the network device, a first quantity of pieces of the first channel quality information sent by the terminal device based on the channel quality threshold includes:

receiving, by the network device, the first quantity and the first quantity of pieces of the first channel quality information that are sent by the terminal device based on the channel quality threshold.

Correspondingly, S230 may be sending, by the terminal device, the first quantity and the first quantity of pieces of the first channel quality information to the network device.

Specifically, in a case in which the terminal device sends all first channel quality information corresponding to the first quantity of reference signals together to the network device when determining second channel quality information corresponding to the first quantity of reference signals that meet the channel quality threshold, the terminal device may send the determined first quantity to the network device, and the network device may determine, based on the first quantity sent by the terminal device, a size and a length of the first channel quality information sent by the terminal device, so as to perform a corresponding decoding operation on the received first channel quality information.

In an optional embodiment, before the sending, by the terminal device, the first quantity of pieces of the first channel quality information to the network device based on the channel quality threshold in S230, the method further includes:

determining, by the terminal device, the first quantity based on the channel quality threshold and the second quantity.

The sending, by the terminal device, the first quantity of pieces of the first channel quality information to the network device based on the channel quality threshold in S230 includes:

sending, by the terminal device, the first quantity and the first quantity of pieces of the first channel quality information to the network device.

Correspondingly, the network device receives the first quantity and the first quantity of pieces of first channel quality information that are sent by the terminal device.

It should be understood that if the terminal device does not send a quantity of pieces of to-be-reported first channel quality information to the network device, the terminal device needs to encode to-be-sent first channel quality information based on a maximum length that can be transmitted at a time and send the encoded to-be-sent first channel quality information to the network device, so that the network device performs decoding. In this embodiment, the terminal device may perform reporting based on an actual situation. The network device may determine, based on the first quantity sent by the terminal device, a quantity of pieces of first channel quality information reported by the terminal device, and decode the quantity of pieces of first channel quality information, so as to reduce reporting overheads of the terminal device.

In an optional embodiment, the sending, by the terminal device, the first quantity and the first quantity of pieces of the first channel quality information to the network device includes:

separately encoding, by the terminal device, the first quantity and the first quantity of pieces of the first channel quality information; and sending, by the terminal device, the encoded first quantity and the first quantity of pieces of the encoded first channel quality information to the network device.

Specifically, a quantity of pieces of first channel quality information sent by the terminal device each time is not fixed, and an encoding length and size may be dynamically adjusted based on an actual quantity when the first channel quality information is sent. Therefore, when sending the first quantity and the first quantity of pieces of first channel quality information to the network device, the terminal device may encode the first quantity separately. In this case, after receiving the first quantity and the first quantity of pieces of first channel quality information, the network device may first decode the first quantity to determine how many pieces of first channel quality information have been sent by the terminal device, and then decode the first channel quality information. Therefore, separate encoding on the first quantity can help the network device to obtain the first quantity as soon as possible and decode corresponding first channel quality information based on the first quantity.

It should be understood that the terminal device may alternatively perform joint encoding on the first quantity and the first quantity of pieces of the first channel quality information. This is not limited in this embodiment of this application.

In an optional embodiment, before the receiving, by the network device, a first quantity of pieces of the first channel quality information sent by the terminal device based on the channel quality threshold, the method further includes:

sending, by the network device, a first notification message to the terminal device, where the first notification message is used to notify sending of a reference signal from the network device to the terminal device; and correspondingly, receiving, by the terminal device, the first notification message sent by the network device.

Specifically, before sending a reference signal to the terminal device, the network device may first send the first notification message to the terminal device, to notify the terminal device that the network device is to send reference signals to the terminal device at the following P (P is an integer greater than or equal to 1) consecutive reference-signal transmit time points. In this case, the terminal device can get ready to receive, in a timely manner, the reference signals sent by the network device, and measure channel quality corresponding to the reference signals.

In an optional embodiment, the method further includes:

sending, by the network device, a second notification message to the terminal device, where the second notification message is used to notify termination of sending of a reference signal from the network device to the terminal device; and correspondingly, receiving, by the terminal device, the second notification message sent by the network device.

Specifically, the network device may send the second notification message to the terminal device, to notify the terminal device that the network device stops sending a reference signal. It should be understood that when the terminal device reports first channel quality information corresponding to each reference signal that meets the channel quality threshold, if the network device already determines a sufficient first quantity of pieces of first channel quality information, the network device may send the second notification message to the terminal device, and after receiving the second notification message, the terminal device no longer receives a reference signal, nor measures channel quality of the reference signal, nor reports first channel quality information to the network device. This reduces reporting overheads of the terminal device and processing complexity of the terminal device to some extent.

It should be understood that the network device may also send the second notification message to the terminal device before receiving the first quantity of pieces of the first channel quality information sent by the terminal device based on the channel quality threshold, where the second notification message is used to notify termination of sending of a reference signal from the network device to the terminal device. That is, the channel quality information is reported after the network device sends the second notification message to the terminal device.

In an optional embodiment, the first channel quality information may be at least one of the following information:

a reference signal index, a reference signal received power (RSRP) corresponding to the reference signal index, a reference signal received quality (RSRQ) corresponding to the reference signal index, or a channel quality indicator (CQI) corresponding to the reference signal index, where the reference signal index is used to indicate a reference signal corresponding to the first channel quality information.

It should be understood that the first channel quality information may be CSI information in LTE, for example, at least one of a channel state information-reference signal indicator (CRI), a rank indicator (RI), a precoding matrix indicator (PMI), a CQI, and the like. Alternatively, the first channel quality information may be channel quality information obtained through radio resource management (RRM) measurement, for example, at least one of an RSRP, an RSRQ, and the like. In addition, the first channel quality information may alternatively be any one or more pieces of other channel quality information different from the foregoing information, or may further include both the foregoing information and any one or more pieces of other channel quality information. This is not limited in this embodiment of this application.

In an optional embodiment, the second channel quality information is a reference signal received power RSRP, a reference signal received quality RSRQ, or a channel quality indicator CQI.

Specifically, the second channel quality information is a trigger quantity; therefore, the second channel quality information is any type of channel quality information. It should be understood that the second channel quality information may be any one of the CRI, RI, PMI, CQI, RSRP, or RSRQ, or may be any type of other channel quality information. This is not limited in this embodiment of this application.

In an optional embodiment, the sending, by the terminal device, the first quantity of pieces of the first channel quality information to the network device based on the channel quality threshold includes:

sending, by the terminal device, the first quantity of pieces of the first channel quality information to the network device by using a physical uplink control channel PUCCH and/or a physical uplink shared channel PUSCH.

Figure 3:
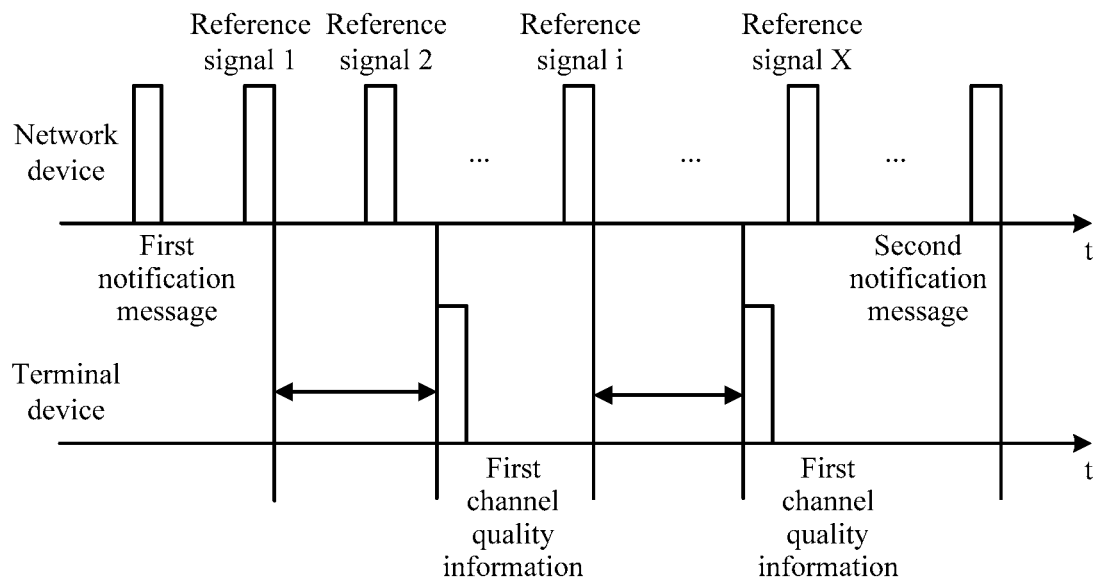
FIG. 3 is a schematic flowchart of another signal communication method according to an embodiment of this application.

FIG. 3 is a schematic flowchart of a signal communication method according to an embodiment of this application. The method may be applied to the system architecture shown in FIG. 1. However, no limitation is imposed thereon in this embodiment of this application. A network device first sends a first notification message to a terminal device, to notify the terminal device that the network device is to send reference signals at the following P (P is an integer greater than or equal to 1) consecutive reference-signal transmit time points. Then, as shown in FIG. 3, the network device sends the reference signals. The terminal device receives a reference signal 1 sent by the network device, and during reception, measures channel quality corresponding to the reference signal 1, to obtain first channel quality information and second channel quality information. When the second channel quality information meets a channel quality threshold, the terminal device sends the first channel quality information corresponding to the reference signal 1 to the network device. It should be understood that when reporting the first channel quality information corresponding to the reference signal 1, the terminal device is still receiving another reference signal and performing detection. If the terminal device detects that second channel quality information corresponding to a reference signal i meets a channel quality threshold, the terminal device reports first channel quality information corresponding to the reference signal i to the network device. After the network device separately receives the first channel quality information corresponding to the reference signal 1 and the first channel quality information corresponding to the reference signal i, if the network device considers that channel quality measurement does not need to be performed, the network device stops sending of a reference signal, and sends a second notification message to the terminal device, to notify the terminal device that the network device stops sending a reference signal.

Therefore, according to the signal communication method in this embodiment of this application, reporting resource overheads of the terminal device can be reduced, communication resource overheads of the network device can be reduced, and processing complexity of the terminal device is reduced, thereby improving user experience.

It should be understood that sequence numbers of the foregoing processes do not mean execution sequences. The execution sequences of the processes should be determined based on functions and internal logic of the processes, and should not be construed as any limitation on the implementation processes in this embodiment of this application.

The foregoing describes in detail the signal communication method with reference to FIG. 1 to FIG. 3 according to the embodiments of this application. The following describes in detail a signal communication apparatus with reference to FIG. 4 to FIG. 7 according to embodiments of this application.

Figure 4:
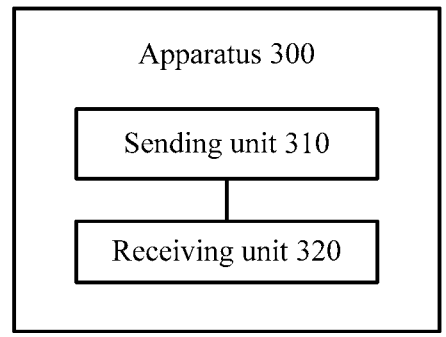
FIG. 4 is a schematic block diagram of a signal communication apparatus according to an embodiment of this application.

FIG. 4 shows a signal communication apparatus 300 according to an embodiment of this application. The apparatus 300 includes:

a sending unit 310, configured to send a channel quality threshold to a terminal device, where the channel quality threshold is used by the terminal device to report first channel quality information, and the channel quality threshold is a threshold of second channel quality information; and a receiving unit 320, configured to receive a first quantity of pieces of the first channel quality information sent by the terminal device based on the channel quality threshold.

According to the signal communication apparatus in this embodiment of this application, the network device sends the channel quality threshold to the terminal device, and triggers the terminal device to report channel quality information corresponding to a reference signal that meets a condition. This can prevent the terminal device from reporting unnecessary channel quality information, and reduce signaling overheads and energy consumption of the terminal device, thereby improving user experience.

Optionally, the sending unit 310 is further configured to send a second quantity to the terminal device before the first quantity of pieces of the first channel quality information sent by the terminal device based on the channel quality threshold is received. The second quantity is used to indicate a quantity of pieces of the first channel quality information configured for the terminal device by the apparatus. The receiving unit 320 is further configured to receive the first quantity of pieces of the first channel quality information sent by the terminal device based on the channel quality threshold and the second quantity. The first quantity is less than or equal to the second quantity.

Optionally, the sending unit 310 is specifically configured to send first signaling to the terminal device. The first signaling carries the second quantity, and the first signaling is higher layer signaling or physical layer signaling.

Optionally, the sending unit 310 is specifically configured to send second signaling to the terminal device. The second signaling carries the channel quality threshold, and the second signaling is higher layer signaling and/or physical layer signaling.

Optionally, the receiving unit 320 is specifically configured to receive the first quantity and the first quantity of pieces of the first channel quality information that are sent by the terminal device based on the channel quality threshold.

Optionally, the sending unit 310 is further configured to send a first notification message to the terminal device before the first quantity of pieces of the first channel quality information sent by the terminal device based on the channel quality threshold is received. The first notification message is used to notify sending of a reference signal from the apparatus to the terminal device.

Optionally, the sending unit 310 is further configured to send a second notification message to the terminal device. The second notification message is used to notify termination of sending of a reference signal from the apparatus to the terminal device.

Optionally, the first channel quality information is at least one of the following information: a reference signal index, a reference signal received power RSRP corresponding to the reference signal index, a reference signal received quality RSRQ corresponding to the reference signal index, or a channel quality indicator CQI corresponding to the reference signal index. The reference signal index is used to indicate a reference signal corresponding to the first channel quality information.

Optionally, the second channel quality information is a reference signal received power RSRP, a reference signal received quality RSRQ, or a channel quality indicator CQI.

It should be understood that the apparatus 300 herein is embodied in a form of a functional unit. The term "unit" herein may be an application-specific integrated circuit (ASIC), an electronic circuit, a processor configured to execute one or more software or firmware programs (for example, a shared processor, a dedicated processor, or a group processor) and a memory, or a merged logic circuit and/or another appropriate component supporting the described functions. In an optional example, a person skilled in the art may understand that the apparatus 300 may be specifically the network device in the foregoing embodiments, and the apparatus 300 may be configured to perform procedures and/or steps corresponding to the network device in the foregoing method embodiments. To avoid repetition, details are not described herein again.

Figure 5:
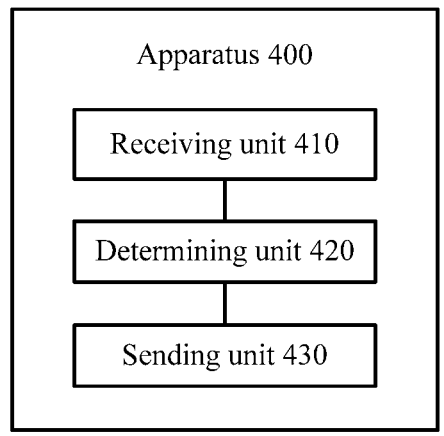
FIG. 5 is a schematic block diagram of another signal communication apparatus according to an embodiment of this application.

FIG. 5 shows a signal communication apparatus 400 according to an embodiment of this application. The apparatus 400 includes:

a receiving unit 410, configured to receive a channel quality threshold sent by a network device, where the channel quality threshold is used by the apparatus to report first channel quality information, and the channel quality threshold is a threshold of second channel quality information;

a determining unit 420, configured to determine a first quantity of pieces of the first channel quality information based on the channel quality threshold; and a sending unit 430, configured to send the first quantity of pieces of the first channel quality information to the network device.

According to the signal communication apparatus in this embodiment of this application, the terminal device receives the channel quality threshold sent by the network device, and the terminal device is triggered to report channel quality information corresponding to a reference signal that meets a condition. This can prevent the terminal device from reporting unnecessary channel quality information, and reduce signaling overheads and energy consumption of the terminal device, thereby improving user experience.

Optionally, the receiving unit 410 is further configured to: before the first quantity of pieces of the first channel quality information is sent to the network device based on the channel quality threshold, receive a second quantity sent by the network device. The second quantity is used to indicate a quantity of pieces of the first channel quality information configured for the apparatus by the network device. The sending unit 430 is specifically configured to send the first quantity of pieces of the first channel quality information to the network device based on the channel quality threshold and the second quantity. The first quantity is less than or equal to the second quantity.

Optionally, the determining unit 420 is further configured to: before the first quantity of pieces of the first channel quality information is sent to the network device based on the channel quality threshold, determine the first quantity based on the channel quality threshold and the second quantity. The sending unit 430 is specifically configured to send the first quantity and the first quantity of pieces of the first channel quality information to the network device.

Optionally, the apparatus further includes an encoding unit, configured to separately encode the first quantity and the first quantity of pieces of the first channel quality information. The sending unit 430 is specifically configured to send the encoded first quantity and the first quantity of pieces of the encoded first channel quality information to the network device.

Optionally, the receiving unit 410 is further configured to: before the first quantity of pieces of the first channel quality information is sent to the network device based on the channel quality threshold, receive a first notification message sent by the network device. The first notification message is used to notify sending of a reference signal from the network device to the apparatus.

Optionally, the receiving unit 410 is further configured to receive a second notification message sent by the network device. The second notification message is used to notify termination of sending of a reference signal from the network device to the apparatus.

Optionally, the first channel quality information is at least one of the following information: a reference signal index, a reference signal received power RSRP corresponding to the reference signal index, a reference signal received quality RSRQ corresponding to the reference signal index, or a channel quality indicator CQI corresponding to the reference signal index. The reference signal index is used to indicate a reference signal corresponding to the first channel quality information.

Optionally, the second channel quality information is a reference signal received power RSRP, a reference signal received quality RSRQ, or a channel quality indicator CQI.

Optionally, the sending unit 430 is specifically configured to send the first quantity of pieces of the first channel quality information to the network device by using a physical uplink control channel PUCCH and/or a physical uplink shared channel PUSCH.

It should be understood that the apparatus 400 herein is embodied in a form of a functional unit. The term "unit" herein may be an application-specific integrated circuit (ASIC), an electronic circuit, a processor configured to execute one or more software or firmware programs (for example, a shared processor, a dedicated processor, or a group processor) and a memory, or a merged logic circuit and/or another appropriate component supporting the described functions. In an optional example, a person skilled in the art may understand that the apparatus 400 may be specifically the terminal device in the foregoing embodiments, and the apparatus 400 may be configured to perform procedures and/or steps corresponding to the terminal device in the foregoing method embodiments. To avoid repetition, details are not described herein again.

Figure 6:
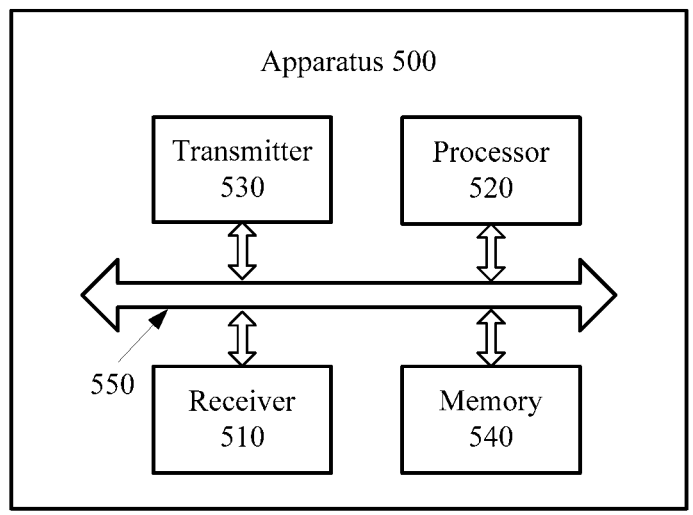
FIG. 6 is a schematic block diagram of another signal communication apparatus according to an embodiment of this application.

FIG. 6 shows a signal communication apparatus 500 according to an embodiment of this application. The apparatus 500 includes a receiver 510, a processor 520, a transmitter 530, a memory 540, and a bus system 550. The receiver 510, the processor 520, the transmitter 530, and the memory 540 are connected by using the bus system 550. The memory 540 is configured to store an instruction. The processor 520 is configured to execute the instruction stored in the memory 540, to control the receiver 510 to receive a signal and control the transmitter 530 to send an instruction.

The transmitter 530 is configured to send a channel quality threshold to a terminal device. The channel quality threshold is used by the terminal device to report first channel quality information, and the channel quality threshold is a threshold of second channel quality information.

The receiver 510 is configured to receive a first quantity of pieces of the first channel quality information sent by the terminal device based on the channel quality threshold.

According to the signal communication apparatus in this embodiment of this application, the network device sends the channel quality threshold to the terminal device, and triggers the terminal device to report channel quality information corresponding to a reference signal that meets a condition. This can prevent the terminal device from reporting unnecessary channel quality information, and reduce signaling overheads and energy consumption of the terminal device, thereby improving user experience.

Optionally, the transmitter 530 is further configured to send a second quantity to the terminal device before the first quantity of pieces of the first channel quality information sent by the terminal device based on the channel quality threshold is received. The second quantity is used to indicate a quantity of pieces of the first channel quality information configured for the terminal device by the apparatus. The receiver 510 is further configured to receive the first quantity of pieces of the first channel quality information sent by the terminal device based on the channel quality threshold and the second quantity. The first quantity is less than or equal to the second quantity.

Optionally, the transmitter 530 is specifically configured to send first signaling to the terminal device. The first signaling carries the second quantity, and the first signaling is higher layer signaling or physical layer signaling.

Optionally, the transmitter 530 is specifically configured to send second signaling to the terminal device. The second signaling carries the channel quality threshold, and the second signaling is higher layer signaling and/or physical layer signaling.

Optionally, the receiver 510 is specifically configured to receive the first quantity and the first quantity of pieces of the first channel quality information that are sent by the terminal device based on the channel quality threshold.

Optionally, the transmitter 530 is further configured to send a first notification message to the terminal device before the first quantity of pieces of the first channel quality information sent by the terminal device based on the channel quality threshold is received. The first notification message is used to notify sending of a reference signal from the apparatus to the terminal device.

Optionally, the transmitter 530 is further configured to send a second notification message to the terminal device. The second notification message is used to notify termination of sending of a reference signal from the apparatus to the terminal device.

Optionally, the first channel quality information is at least one of the following information: a reference signal index, a reference signal received power RSRP corresponding to the reference signal index, a reference signal received quality RSRQ corresponding to the reference signal index, or a channel quality indicator CQI corresponding to the reference signal index. The reference signal index is used to indicate a reference signal corresponding to the first channel quality information.

Optionally, the second channel quality information is a reference signal received power RSRP, a reference signal received quality RSRQ, or a channel quality indicator CQI.

It should be understood that the apparatus 500 may be specifically the network device in the foregoing embodiments, and may be configured to perform steps and/or procedures corresponding to the network device in the foregoing method embodiments. Optionally, the memory 540 includes a read-only memory and a random access memory, and provides an instruction and data for the processor. A part of the memory may further include a nonvolatile random access memory. For example, the memory may further store device type information. The processor 520 may be configured to execute the instruction stored in the memory. When the processor executes the instruction, the processor can perform the steps and/or the procedures corresponding to the network device in the foregoing method embodiments.

Figure 7:
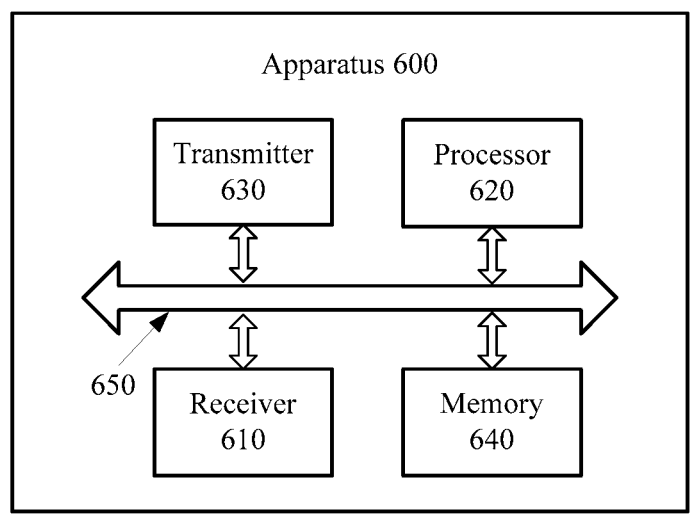
FIG. 7 is a schematic block diagram of another signal communication apparatus according to an embodiment of this application.

FIG. 7 shows a signal communication apparatus 600 according to an embodiment of this application. The apparatus 600 includes a receiver 610, a processor 620, a transmitter 630, a memory 640, and a bus system 650. The receiver 610, the processor 620, the transmitter 630, and the memory 640 are connected by using the bus system 650. The memory 640 is configured to store an instruction. The processor 620 is configured to execute the instruction stored in the memory 640, to control the receiver 610 to receive a signal and control the transmitter 630 to send an instruction.

The receiver 610 is configured to receive a channel quality threshold sent by a network device. The channel quality threshold is used by the apparatus to report first channel quality information, and the channel quality threshold is a threshold of second channel quality information.

The processor 620 is configured to determine a first quantity of pieces of the first channel quality information based on the channel quality threshold.

The transmitter 630 is configured to send the first quantity of pieces of the first channel quality information to the network device.

According to the signal communication apparatus in this embodiment of this application, the terminal device receives the channel quality threshold sent by the network device, and the terminal device is triggered to report channel quality information corresponding to a reference signal that meets a condition. This can prevent the terminal device from reporting unnecessary channel quality information, and reduce signaling overheads and energy consumption of the terminal device, thereby improving user experience.

Optionally, the receiver 610 is further configured to: before the first quantity of pieces of the first channel quality information is sent to the network device based on the channel quality threshold, receive a second quantity sent by the network device. The second quantity is used to indicate a quantity of pieces of the first channel quality information configured for the apparatus by the network device. The transmitter 630 is specifically configured to send the first quantity of pieces of the first channel quality information to the network device based on the channel quality threshold and the second quantity. The first quantity is less than or equal to the second quantity.

Optionally, the processor 620 is further configured to: before the first quantity of pieces of the first channel quality information is sent to the network device based on the channel quality threshold, determine the first quantity based on the channel quality threshold and the second quantity. The transmitter 630 is specifically configured to send the first quantity and the first quantity of pieces of the first channel quality information to the network device.

Optionally, the apparatus further includes an encoding unit, configured to separately encode the first quantity and the first quantity of pieces of the first channel quality information. The transmitter 630 is specifically configured to send the encoded first quantity and the first quantity of pieces of the encoded first channel quality information to the network device.

Optionally, the receiver 610 is further configured to: before the first quantity of pieces of the first channel quality information is sent to the network device based on the channel quality threshold, receive a first notification message sent by the network device. The first notification message is used to notify sending of a reference signal from the network device to the apparatus.

Optionally, the receiver 610 is further configured to receive a second notification message sent by the network device. The second notification message is used to notify termination of sending of a reference signal from the network device to the apparatus.

Optionally, the first channel quality information is at least one of the following information: a reference signal index, a reference signal received power RSRP corresponding to the reference signal index, a reference signal received quality RSRQ corresponding to the reference signal index, or a channel quality indicator CQI corresponding to the reference signal index. The reference signal index is used to indicate a reference signal corresponding to the first channel quality information.

Optionally, the second channel quality information is a reference signal received power RSRP, a reference signal received quality RSRQ, or a channel quality indicator CQI.

Optionally, the transmitter 630 is specifically configured to send the first quantity of pieces of the first channel quality information to the network device by using a physical uplink control channel PUCCH and/or a physical uplink shared channel PUSCH.

It should be understood that the apparatus 600 may be specifically the terminal device in the foregoing embodiments, and may be configured to perform steps and/or procedures corresponding to the terminal device in the foregoing method embodiments. Optionally, the memory 640 includes a read-only memory and a random access memory, and provides an instruction and data for the processor. A part of the memory may further include a nonvolatile random access memory. For example, the memory may further store device type information. The processor 620 may be configured to execute the instruction stored in the memory. When the processor executes the instruction, the processor can perform the steps and/or the procedures corresponding to the terminal device in the foregoing method embodiments.

It should be understood that in the embodiment of this application, the processor in the foregoing apparatus may be a central processing unit (CPU), or the processor may be another general purpose processor, a digital signal processor (DSP), an application-specific integrated circuit (ASIC), a field programmable gate array (FPGA), or another programmable logic device, a discrete gate or transistor logic device, a discrete hardware component, or the like. The general purpose processor may be a microprocessor, or the processor may be any conventional processor or the like.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software unit. A software unit may be located in a mature storage medium in the art, such as a random access memory, a flash memory, a read-only memory, a programmable read-only memory, an electrically erasable programmable memory, or a register. The storage medium is located in the memory, and a processor executes instructions in the memory and completes the steps in the foregoing methods in combination with hardware of the processor. To avoid repetition, details are not described herein again.

A person of ordinary skill in the art may be aware that, with reference to the examples described in the embodiments disclosed in this specification, method steps and units can be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division, or may be other division in actual implementation. For example, a plurality of units or components may be combined or integrated into another system, or some features may be ignored, or may not be performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A signal communication method, comprising:
sending, by a network device, a channel quality threshold to a terminal device, wherein the channel quality threshold is used by the terminal device to trigger reporting of first channel quality information, and the channel quality threshold is a threshold of second channel quality information;
receiving, by the network device, a first quantity of pieces of the first channel quality information sent by the terminal device that are triggered by the channel quality threshold;
determining, by the network device, that the first quantity has met a preset requirement; and
in response to determining that the first quantity has met the preset requirement, sending, by the network device, a notification message to the terminal device, wherein the notification message notifies a termination of sending of a reference signal from the network device to the terminal device.

2. The signal communication method according to claim 1, wherein the sending, by a network device, a channel quality threshold to a terminal device comprises:
sending, by the network device, first signaling to the terminal device, wherein the first signaling carries the channel quality threshold, and the first signaling is at least one of higher layer signaling or physical layer signaling.

3. The signal communication method according to claim 1, wherein before the receiving, by the network device, a first quantity of pieces of the first channel quality information sent by the terminal device based on the channel quality threshold, the method further comprises:
sending, by the network device, a first notification message to the terminal device, wherein the first notification message notifies sending of a reference signal from the network device to the terminal device.

4. The signal communication method according to claim 1, wherein the first channel quality information is at least one of the following information:
a reference signal index, a reference signal received power (RSRP) corresponding to the reference signal index, a reference signal received quality (RSRQ) corresponding to the reference signal index, or a channel quality indicator (CQI) corresponding to the reference signal index, wherein the reference signal index indicates a reference signal corresponding to the first channel quality information.

5. The signal communication method according to claim 1, wherein the second channel quality information is a reference signal received power (RSRP), a reference signal received quality (RSRQ), or a channel quality indicator (CQI).

6. A signal communication method, comprising:
receiving, by a terminal device, a channel quality threshold sent by a network device, wherein the channel quality threshold is used by the terminal device to trigger reporting of first channel quality information, and the channel quality threshold is a threshold of second channel quality information;
determining, by the terminal device, a first quantity of pieces of the first channel quality information that are triggered by the channel quality threshold;
sending, by the terminal device, the first quantity of pieces of the first channel quality information to the network device; and
in response to the first quantity of pieces of the first channel quality information meeting a preset requirement, receiving, by the terminal device, a notification message sent by the network device, wherein the notification message notifies a termination of sending of a reference signal from the network device to the terminal device.

7. The signal communication method according to claim 6, wherein before the sending, by the terminal device, the first quantity of pieces of the first channel quality information to the network device based on the channel quality threshold, the method further comprises:
receiving, by the terminal device, a first notification message sent by the network device, wherein the first notification message notifies sending of a reference signal from the network device to the terminal device.

8. The signal communication method according claim 6, wherein the first channel quality information is at least one of the following information:
a reference signal index, a reference signal received power (RSRP) corresponding to the reference signal index, a reference signal received quality (RSRQ) corresponding to the reference signal index, or a channel quality indicator (CQI) corresponding to the reference signal index, wherein the reference signal index indicates a reference signal corresponding to the first channel quality information.

9. The signal communication method according to claim 6, wherein the second channel quality information is a reference signal received power (RSRP), a reference signal received quality (RSRQ), or a channel quality indicator (CQI).

10. An apparatus, comprising: one or more processors, and a non-transitory storage medium configure to store program instructions; wherein, when executed by the one or more processors, the program instructions cause the apparatus to perform operations comprising:

sending, by the apparatus, a channel quality threshold to a terminal device, wherein the channel quality threshold is used by the terminal device to trigger reporting of first channel quality information, and the channel quality threshold is a threshold of second channel quality information;

receiving, by the apparatus, a first quantity of pieces of the first channel quality information sent by the terminal device that are triggered by the channel quality threshold;

determining, by the apparatus, that the first quantity has met a preset requirement; and in response to determining that the first quantity has met the preset requirement, sending, by the apparatus, a notification message to the terminal device, wherein the notification message notifies a termination of sending of a reference signal from the apparatus to the terminal device.

11. The apparatus according to claim 10, wherein the sending, by the apparatus, a channel quality threshold to a terminal device comprises:

sending, by the apparatus, first signaling to the terminal device, wherein the first signaling carries the channel quality threshold, and the first signaling is at least one of higher layer signaling or physical layer signaling.

12. The apparatus according to claim 10, wherein before the receiving, by the apparatus, a first quantity of pieces of the first channel quality information sent by the terminal device based on the channel quality threshold, the operations further comprise:

sending, by the apparatus, a first notification message to the terminal device, wherein the first notification message notifies sending of a reference signal from the apparatus to the terminal device.

13. The apparatus according to claim 10, wherein the first channel quality information is at least one of the following information:

a reference signal index, a reference signal received power (RSRP) corresponding to the reference signal index, a reference signal received quality (RSRQ) corresponding to the reference signal index, or a channel quality indicator (CQI) corresponding to the reference signal index, wherein the reference signal index indicates a reference signal corresponding to the first channel quality information.

14. The apparatus according to claim 10, wherein the second channel quality information is a reference signal received power (RSRP), a reference signal received quality (RSRQ), or a channel quality indicator (CQI).

15. An apparatus, comprising: one or more processors, and a non-transitory storage medium configure to store program instructions; wherein, when executed by the one or more processors, the program instructions cause the apparatus to perform operations comprising:

receiving, by the apparatus, a channel quality threshold sent by a network device, wherein the channel quality threshold is used by the apparatus to trigger reporting of first channel quality information, and the channel quality threshold is a threshold of second channel quality information;

determining, by the apparatus, a first quantity of pieces of the first channel quality information that are triggered by the channel quality threshold;

sending, by the apparatus, the first quantity of pieces of the first channel quality information to the network device; and in response to the first quantity of pieces of the first channel quality information meeting a preset requirement, receiving, by the apparatus, a notification message sent by the network device, wherein the notification message notifies a termination of sending of a reference signal from the network device to the apparatus.

16. The apparatus according to claim 15, wherein before the sending, by the apparatus, the first quantity of pieces of the first channel quality information to the network device based on the channel quality threshold, the operations further comprise:

receiving, by the apparatus, a first notification message sent by the network device, wherein the first notification message notifies sending of a reference signal from the network device to the apparatus.

17. The apparatus according to claim 15, wherein the first channel quality information is at least one of the following information:

a reference signal index, a reference signal received power (RSRP) corresponding to the reference signal index, a reference signal received quality (RSRQ) corresponding to the reference signal index, or a channel quality indicator (CQI) corresponding to the reference signal index, wherein the reference signal index indicates a reference signal corresponding to the first channel quality information.

18. The apparatus according to claim 15, wherein the second channel quality information is a reference signal received power (RSRP), a reference signal received quality (RSRQ), or a channel quality indicator (CQI).

* * * * *